United States Patent
Lee et al.

(10) Patent No.: US 8,243,771 B2
(45) Date of Patent: Aug. 14, 2012

(54) DRIVING METHOD OF GLOBAL POSITIONING SYSTEM USING SHORT-RANGE COMMUNICATION

(75) Inventors: Sung-Hwan Lee, Suwon-si (KR); Wan-Jin Kim, Seoul (KR); Min-Seop Jeong, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 274 days.

(21) Appl. No.: 12/354,846

(22) Filed: Jan. 16, 2009

(65) Prior Publication Data
US 2009/0180519 A1 Jul. 16, 2009

(30) Foreign Application Priority Data
Jan. 18, 2008 (KR) .................................. 2008-05735

(51) Int. Cl.
*H04B 1/00* (2006.01)
(52) U.S. Cl. ....................................... 375/130; 375/132
(58) Field of Classification Search .................. 375/130, 375/132
See application file for complete search history.

(56) References Cited

U.S. PATENT DOCUMENTS

| | | | |
|---|---|---|---|
| 6,246,376 B1 * | 6/2001 | Bork et al. | 343/760 |
| 7,688,260 B2 * | 3/2010 | Pomerantz et al. | 342/357.75 |
| 7,724,612 B2 * | 5/2010 | Azim | 368/47 |
| 2001/0029166 A1 * | 10/2001 | Rune et al. | 455/41 |
| 2002/0180640 A1 * | 12/2002 | Gilkes et al. | 342/387 |
| 2004/0136338 A1 * | 7/2004 | Lin et al. | 370/329 |
| 2008/0258965 A1 * | 10/2008 | Azim | 342/357.1 |

FOREIGN PATENT DOCUMENTS

| | | |
|---|---|---|
| KR | 20020073537 | 9/2002 |
| KR | 20030030745 | 4/2003 |
| KR | 20060030276 | 4/2006 |
| KR | 20060097155 | 9/2006 |

* cited by examiner

*Primary Examiner* — Shuwang Liu
*Assistant Examiner* — Nader Bolourchi
(74) *Attorney, Agent, or Firm* — Stanzione & Kim, LLP

(57) ABSTRACT

A global positioning system using Bluetooth technology, including: a first Bluetooth master that receives satellite orbit information; a Bluetooth slave that communicates with the first Bluetooth master in a Bluetooth protocol; and a second Bluetooth master that transmits an inquiry code for communication with the Bluetooth slave in the Bluetooth protocol. The second Bluetooth master provides positioning information by requesting the satellite orbit information from the first Bluetooth master through the Bluetooth slave and transmitting the satellite orbit information to the second Bluetooth master through the Bluetooth slave.

14 Claims, 4 Drawing Sheets

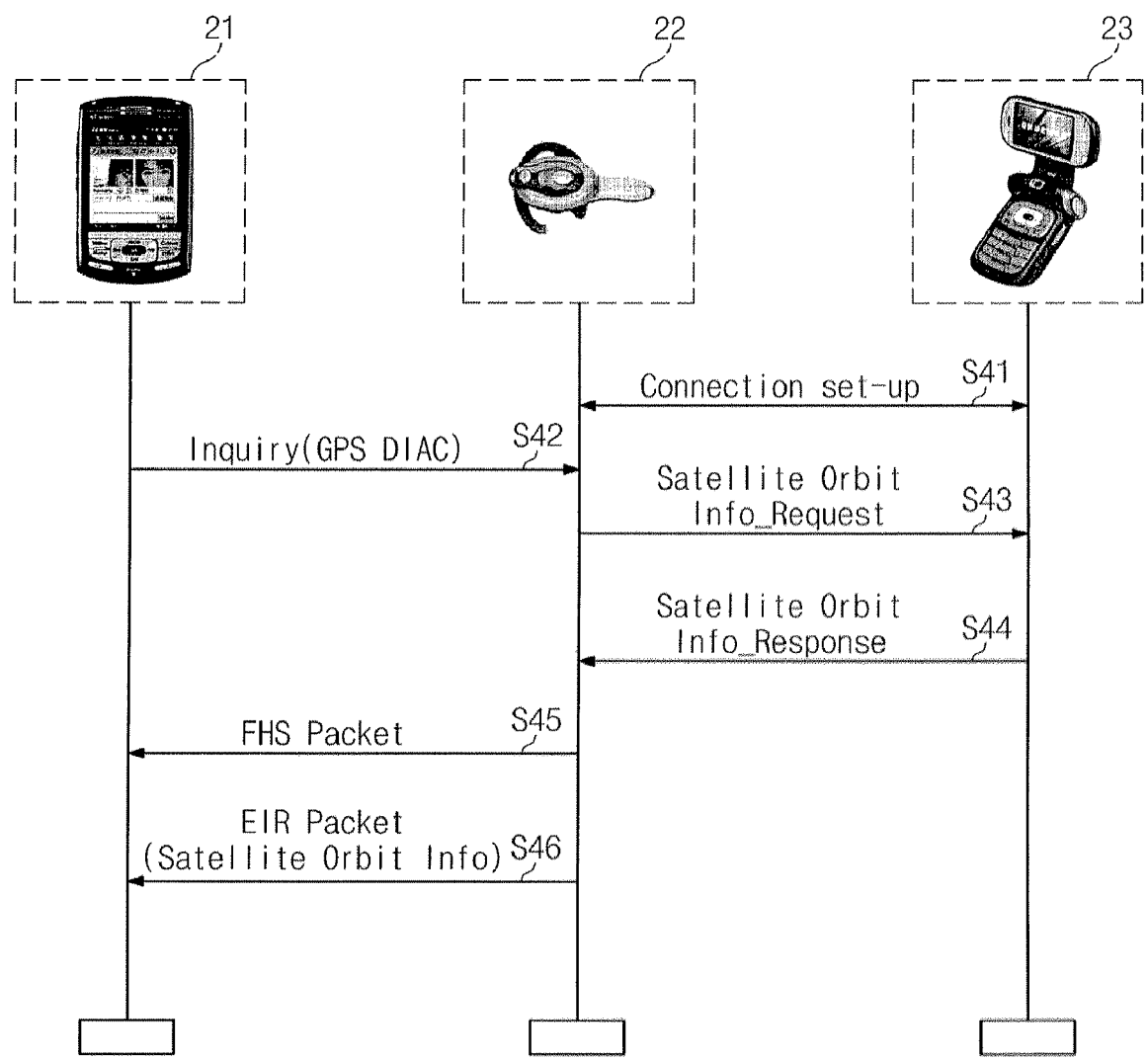

DRIVING METHOD OF GLOBAL POSITIONING SYSTEM USING SHORT-RANGE COMMUNICATION

CROSS-REFERENCE TO RELATED APPLICATIONS

This U.S. non-provisional patent application claims priority under 35 U.S.C. §119 of Korean Patent Application No. 10-2008-0005735 filed on Jan. 18, 2008, the entire contents of which are incorporated herein by reference.

BACKGROUND

Field of the Invention

The present general inventive concept disclosed herein relates to global positioning systems, and more particularly, to a driving method of the global positioning system to obtain satellite orbit information by Bluetooth technology.

In recent years, with increasing expectations for location-based services (LBS), global positioning systems (GPS) are being regarded as the typical systems capable of estimating locations by themselves.

Nowadays products basically equipped with GPS chipsets are widely employed in portable electronic apparatuses such as mobile phones or even cameras, navigation-specific terminals as well.

A GPS calculates its current location by receiving a signal from 24 satellites which are positioned up in the sky over 20,200 km for position estimation.

A basic theory of position estimation is to calculate a pseudo-range between a satellite and a GPS receiver by means of a gap between a transmission time of the satellite and a reception time of the GPS receiver. Pseudo-ranges between the GPS receiver and more than three satellites are used for estimating a current position of the GPS receiver.

To calculate a current position by such a manner, it is necessary to find out a correct location of the satellite and to be operable in synchronization. In the meantime, the satellites load data, such as their orbit conditions and time errors, on codes that are provided for calibrating distances between the GPS receiver and them so as to transmit the positioning information.

SUMMARY

The present general inventive concept provides fast positioning information by means of satellite orbit information transmitted from a Bluetooth master including a satellite receiver (or a GPS receiver).

The present general inventive concept also provides positioning information by means of satellite orbit information transmitted from a Bluetooth master including a satellite receiver, even without a satellite receiver in a GPS.

Additional features and utilities of the present general inventive concept will be set forth in part in the description which follows and, in part, will be obvious from the description, or may be learned by practice of the general inventive concept.

Embodiments of the general inventive concept can be achieved by providing a global positioning system using Bluetooth technology, including: a first Bluetooth master to receive satellite orbit information; a Bluetooth slave to communicate with the first Bluetooth master in a Bluetooth protocol; and a second Bluetooth master to transmit an inquiry code to communicate with the Bluetooth slave in the Bluetooth protocol. The second Bluetooth master can provide positioning information by requesting the satellite orbit information from the first Bluetooth master through the Bluetooth slave and transmitting the satellite orbit information to the second Bluetooth master through the Bluetooth slave.

In an embodiment, the second Bluetooth master is used to search for the Bluetooth slave, which is capable of receiving a satellite signal, by means of the inquiry code.

In an embodiment, the Bluetooth slave is already connected to the first Bluetooth master before communicating with the second Bluetooth master.

In an embodiment, the first Bluetooth master comprises a satellite receiver.

In an embodiment, the first Bluetooth master receives the satellite orbit information through the satellite receiver.

In an embodiment, the satellite orbit information includes information received in 4 hours.

In an embodiment, the second Bluetooth master comprises a satellite receiver.

In an embodiment, the satellite receiver operated in cold and hot start modes.

In an embodiment, the satellite receiver operates in the hot start mode by means of the satellite orbit information received from the first Bluetooth master.

In an embodiment, the Bluetooth protocol includes Bluetooth 2.1.

Embodiments of the general inventive concept can also be achieved by providing a method of operating a global positioning system (GPS), including: requesting readily available satellite orbit information through a Bluetooth slave upon powering up of a Bluetooth master; and accessing the readily available satellite orbit information from a second Bluetooth master by the Bluetooth slave and transmitting the accessed readily available satellite orbit information to the powering up Bluetooth master.

A GPS according to an embodiment of the present general inventive concept operates in the hot start mode by means of satellite orbit information transmitted from a Bluetooth master including the satellite receiver.

The present general inventive concept provides positioning information by means of satellite orbit information transmitted from a Bluetooth master including the satellite receiver, even without a satellite receiver in the GPS.

A further understanding of the nature and advantages of the present general inventive concept herein may be realized by reference to the remaining portions of the specification and the attached drawings.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 4 is a schematic diagram illustrating an embodiment of the present general inventive concept in conjunction with FIG. 2.

DETAILED DESCRIPTION OF THE EMBODIMENTS

Figure 1:
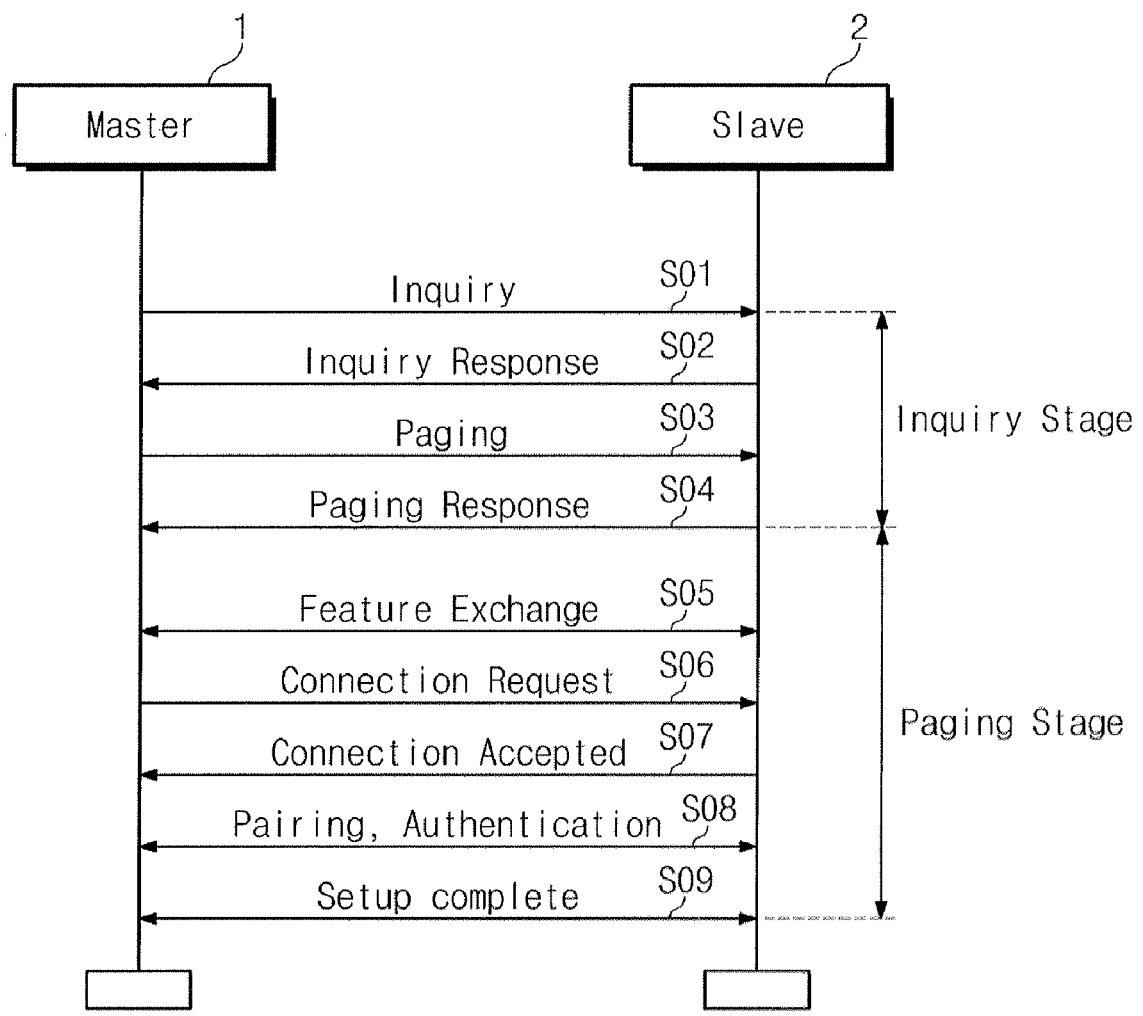
FIG. 1 is a block diagram illustrating a general configuration of interconnection between a Bluetooth master and a Bluetooth slave.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a general configuration of interconnection between a Bluetooth master and a Bluetooth slave. Referring to FIG. 1, a Bluetooth master 1 accesses a Bluetooth slave 2 through two stages, i.e., an inquiry stage of S01~S04 and a paging stage of S05~S09. In other words, interconnection between the Bluetooth master 1 and the Bluetooth slave 2 is accomplished by the inquiry stage S01~S04 to search for the Bluetooth slave 2 by the Bluetooth master 1, and the paging stage S05~S09 to transmit an ID packet, including an Bluetooth address, to the Bluetooth master 1 from the Bluetooth slave 2.

First, in the inquiry stage, the Bluetooth master 1 searches around the area for the Bluetooth slave 2 (operation S01). If there is the Bluetooth slave 2 around the Bluetooth master 1, the Bluetooth slave 2 responds to the Bluetooth master 1 for the inquiry (operation S02). Unless there is the Bluetooth slave 2 around the Bluetooth master 1, the Bluetooth master outputs a signal searching for the Bluetooth slave 2. Then, the Bluetooth master 1 transmits a page signal to the Bluetooth slave 2 to request a Bluetooth address including a clock of the Bluetooth slave 2 (operation S03). The Bluetooth slave 2 transmits a packet, which includes the Bluetooth address, to the Bluetooth master 1 as a paging response signal (operation S04).

Next, in the paging stage, the Bluetooth master 1 and the Bluetooth slave 2 exchange their features with each other (operation S05). In addition, the Bluetooth master 1 requests connection from the Bluetooth slave 2 (operation S06). The Bluetooth slave 2 accepts the request for connection with the Bluetooth master 1 (operation S07).

Then, the Bluetooth master 1 and the Bluetooth slave 2 conduct the operation S08 of pairing and authentication, which makes them exempt from a later authentication requirement once they have been successfully authorized for the first interconnection. Thus, the connection setup operation with the Bluetooth master 1 and the Bluetooth slave 2 is terminated (operation S09).

Generally, a GPS using the Bluetooth technology does not receive satellite orbit information until completing the connection setup operation by entirely conducting the inquiry and paging stages between the Bluetooth master 1 and the Bluetooth slave 2. For that reason, such a GPS by the Bluetooth technology takes much time in completing the connection between the Bluetooth master and the Bluetooth slave.

A GPS generally operates in both cold and hot start modes. The cold start mode refers to a beginning mode to receive new satellite orbit information from a satellite when the GPS operates for the first time or restarts after 4 hours since a termination. In the cold start mode, it takes at least 30 seconds to download data, which are required to estimate a current position, from the satellite. In practice, referring to specification data provided by a manufacturer that produces GPS receiver chipsets, it can be seen that a time for first calculating a current position of a terminal from a satellite (or positioning) signal, i.e., a time-to-first-fix (TIFF), takes in the range of 35~50 seconds.

The hot start mode refers to a mode to shorten a TIFF by means of using the previous satellite orbit information when the GPS restarts. The hot start mode is helpful to shorten the TIFF within several seconds, but is limited in that it is available only when the GPS restarts within 4 hours from the prior termination.

Figure 2:
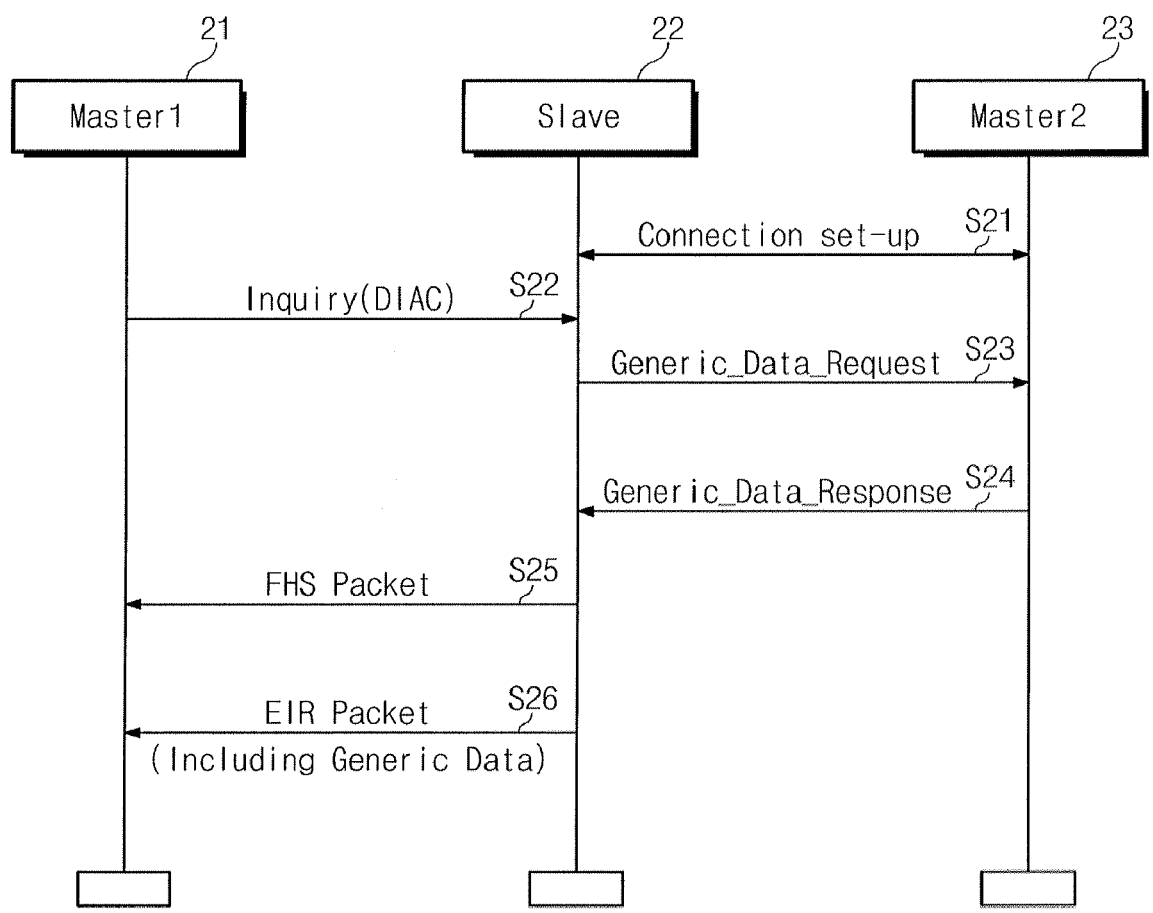
FIG. 2 is a block diagram of a global positioning system using Bluetooth technology according to the present general inventive concept.
Figure 3:
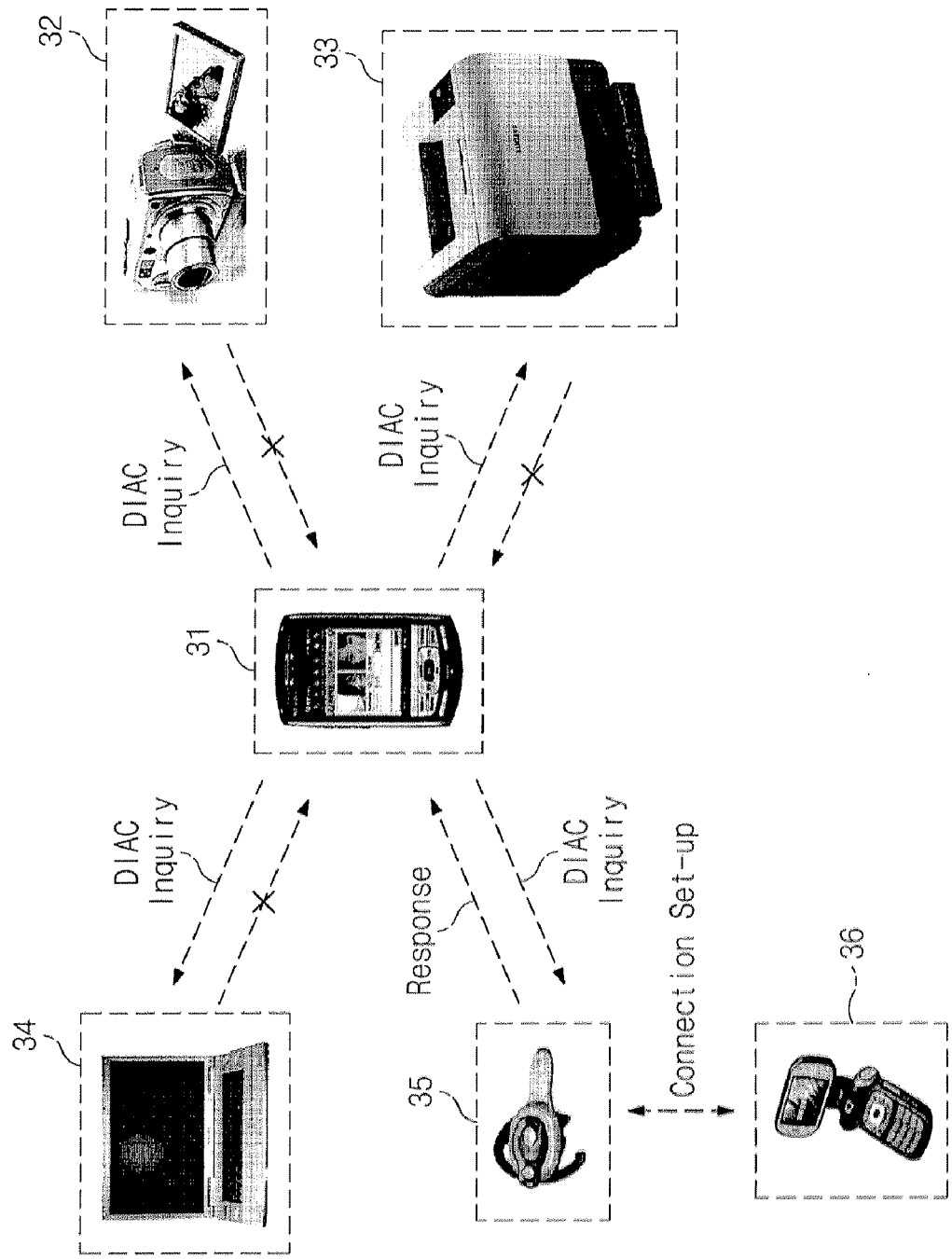
FIG. 3 is a schematic diagram of the DIAC inquiry scheme shown in FIG. 2.

Now a detailed description will be provided regarding a method of receiving new satellite orbit information through the inquiry stage in conjunction with FIGS. 2 and 3.

FIG. 2 is a block diagram of a GPS using the Bluetooth technology according to an embodiment of the present general inventive concept.

Referring to FIG. 2, the Bluetooth-based GPS 100 includes a first Bluetooth master 21, a Bluetooth slave 22, and a second Bluetooth master 23.

The second Bluetooth master 23 includes a satellite receiver (or GPS receiver; not shown), which receives new satellite orbit information through the satellite receiver. Thus, the second Bluetooth master 23 has satellite orbit information that has been received within the past 4 hours. Here, the satellite receiver usually indicates an apparatus including an antenna to receive a satellite signal (positioning or GPS signal) and a chipset to process the satellite signal transferred from the antenna. Thereby, the first Bluetooth master 21 conducts the hot start mode by means of satellite orbit information that has been received within the past 4 hours from the second Bluetooth master 23 through the Bluetooth slave 22.

The second Bluetooth master 23 and the Bluetooth slave 22 are completely set up in connection by an operation S21.

The first Bluetooth master 21 transmits an ID packet to the Bluetooth slave 22, which is around it, by means of a dedicated inquiry access code (DIAC).

DIAC refers to an access code used to inquire a Bluetooth slave, which has a specific function, by a Bluetooth master. FIG. 3 shows a detailed embodiment of DIAC inquiry scheme.

A first Bluetooth master 31 exemplified in FIG. 3 is a personal digital assistant (PDA) phone and a second Bluetooth master 36 is a Bluetooth phone embedding a GPS receiver therein. As shown in FIG. 3, a first Bluetooth slave 32 is a digital camera operable in the Bluetooth function, a second Bluetooth slave 33 is a printer operable in the Bluetooth function, a third Bluetooth slave 34 is a notebook computer operable in the Bluetooth function, and a fourth Bluetooth slave 35 is a headset operable in the Bluetooth function. As shown in FIG. 3, the second Bluetooth master 36 has been already connected to the fourth Bluetooth slave 35 by way of a Bluetooth protocol.

Referring to FIG. 3, the first Bluetooth master 31 transmits a DIAC to the first through fourth Bluetooth slaves 32~35 that are placed around an area thereof in order to search for a Bluetooth slave capable of receiving a GPS signal. Then, the fourth Bluetooth slave 35 transmits a response of the DIAC to the first Bluetooth master 31.

Thereby, the first Bluetooth master 31 becomes connected to the fourth Bluetooth slave 35, which is connected to the second Bluetooth master 36 that is capable of receiving a satellite signal, in the inquiry stage. Thus, the first Bluetooth master 31 receives satellite orbit information from the second Bluetooth master 36 by way of the fourth Bluetooth slave 35.

Returning to FIG. 2, the first Bluetooth master 21 requests satellite orbit information from the second Bluetooth master 23 through the Bluetooth slave 22 (operation S23). The second Bluetooth master 23 transmits the requested satellite orbit information to the Bluetooth slave 22 (operation S24).

The Bluetooth slave 22 transmits a frequency hop selection (FHS) packet to the first Bluetooth master 21 (operation S25).

The FHS packet is provided to set a frequency for Bluetooth communication between the first Bluetooth master 21 and the Bluetooth slave 22.

The Bluetooth slave 22 transmits an extended inquiry response (EIR) packet to the first Bluetooth master 21. The EIR packet is generic information transferred to a Bluetooth master from a Bluetooth slave in the inquiry stage, which was proposed by the Bluetooth 2.1 protocol.

If the first Bluetooth master 21 embeds a satellite receiver (or GPS receiver), it operates in the hot start mode by means of the satellite orbit information transmitted from the second Bluetooth master 23.

Even though the first Bluetooth master 21 do not have a satellite receiver, it is able to calculate positioning information from the satellite orbit information transmitted from the second Bluetooth master 23.

FIG. 4 is a schematic diagram illustrating an embodiment of the present general inventive concept in conjunction with FIG. 2.

Referring to FIG. 4, the Bluetooth phone 23 as the second Bluetooth master and the headset 22 as the Bluetooth slave are complete therebetween in a connection setup (operation S41). The PDA phone 21 as the first Bluetooth master transmits an ID packet to the headset 22, which is located in an area around the PDA phone 21, by means of a DIAC (operation S42). The PDA phone 21 requests satellite orbit information from the Bluetooth phone 23 through the headset 22 (operation S42). Then, the Bluetooth phone 23 transmits the satellite orbit information to the headset 22 (operation S44). The headset 22 transmits an FHS packet to the PDA phone 21 (operation S45). Finally, the headset 22 transmits an EIR packet to the PDA phone 21.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A driving method of a global positioning system having: a first Bluetooth master to receive satellite orbit information; a Bluetooth slave to communicate with the first Bluetooth master in a Bluetooth protocol; and a second Bluetooth master to transmit an inquiry code for communication with the Bluetooth slave in the Bluetooth protocol, the method comprising:

establishing a connection via the Bluetooth protocol between the first Bluetooth master and the Bluetooth slave;

transmitting, by the second Bluetooth master, the inquiry code to the Bluetooth slave to determine if the Bluetooth slave is capable of receiving the satellite orbit information from the first Bluetooth master;

requesting, by the second Bluetooth master, the satellite orbit information from the first Bluetooth master through the Bluetooth slave;

requesting, by the Bluetooth slave, the satellite orbit information from the first Bluetooth master in response to the requesting of the satellite orbit information by the second Bluetooth master;

transmitting the satellite orbit information requested by the Bluetooth slave to the Bluetooth slave from the first Bluetooth master;

transmitting, from the Bluetooth slave, a frequency hop selection (FHS) packet to the second Bluetooth master to establish a set frequency for a connection via the Bluetooth protocol between the Bluetooth slave and the second Bluetooth master; and transmitting the satellite orbit information from the Bluetooth slave to the second Bluetooth master in response to the establishment of the set frequency so as to transmit the satellite orbit information from the first Bluetooth master to the second Bluetooth master through the Bluetooth slave.

2. The method as set forth in claim 1, wherein the second Bluetooth master is used to search for the Bluetooth slave, which is capable of receiving a satellite signal, by means of the inquiry code.

3. The method as set forth in claim 1, wherein the Bluetooth slave is already connected to the first Bluetooth master before communicating with the second Bluetooth master.

4. The method as set forth in claim 1, wherein the first Bluetooth master comprises a satellite receiver.

5. The method as set forth in claim 4, wherein the first Bluetooth master receives the satellite orbit information through the satellite receiver.

6. The method as set forth in claim 1, wherein the satellite orbit information includes information received within 4 hours.

7. The method as set forth in claim 1, wherein the second Bluetooth master comprises a satellite receiver.

8. The method as set forth in claim 7, wherein the satellite receiver can be operated in cold and hot start modes.

9. The method as set forth in claim 8, wherein the satellite receiver operates in the hot start mode by means of the satellite orbit information received from the first Bluetooth master.

10. The method as set forth in claim 1, wherein the Bluetooth protocol includes Bluetooth 2.1.

11. A method of operating a global positioning system (GPS), comprising:

establishing a connection via a Bluetooth protocol between a first Bluetooth master and a Bluetooth slave;

transmitting, by a second Bluetooth master, an inquiry code to the Bluetooth slave to determine if the Bluetooth slave is capable of receiving readily available satellite orbit information from the first Bluetooth master;

requesting, by the second Bluetooth master, the readily available satellite orbit information from the first Bluetooth master through the Bluetooth slave upon powering up of the second Bluetooth master;

requesting, by the Bluetooth slave, the satellite orbit information from the first Bluetooth master in response to the requesting of the satellite orbit information by the second Bluetooth master;

transmitting the satellite orbit information requested by the Bluetooth slave to the Bluetooth slave from the first Bluetooth master;

transmitting, from the Bluetooth slave, a frequency hop selection (FHS) packet to the second Bluetooth master to establish a set frequency for a connection via the Bluetooth protocol between the Bluetooth slave and the second Bluetooth master; and accessing the readily available satellite orbit information from the first Bluetooth master by the Bluetooth slave and transmitting, from the Bluetooth slave to the second Bluetooth master, the accessed readily available satellite orbit information in response to the establishment of the set frequency and the powering up of the second Bluetooth master.

12. The method as set forth in claim 11, wherein the second Bluetooth master receives the readily available satellite orbit information through a satellite antenna.

13. The method as set forth in claim 11, wherein the requesting the readily available satellite orbit information is performed by transmitting an ID packet to the Bluetooth slave by means of a dedicated inquiry access code (DIAC).

14. A method of operating a global positioning system, comprising:
- receiving updated satellite orbit information by a first Bluetooth master via a satellite receiver;
- establishing a connection via a Bluetooth protocol between the first Bluetooth master and a Bluetooth slave;
- transmitting, by a second Bluetooth master, an inquiry code to the Bluetooth slave to determine if the Bluetooth slave is capable of receiving the updated satellite orbit information from the first Bluetooth master;
- receiving a request from the second Bluetooth master for the updated satellite orbit information through the Bluetooth slave by the first Bluetooth master having direct access to the satellite receiver and the updated satellite orbit information;
- requesting, by the Bluetooth slave, the updated satellite orbit information from the first Bluetooth master in response to the requesting of the updated satellite orbit information by the second Bluetooth master;
- transmitting the updated satellite orbit information requested by the Bluetooth slave to the Bluetooth slave from the first Bluetooth master;
- transmitting, from the Bluetooth slave, a frequency hop selection (FHS) packet to the second Bluetooth master to establish a set frequency for a connection via the Bluetooth protocol between the Bluetooth slave and the second Bluetooth master; and
- transmitting the updated satellite orbit information from the Bluetooth slave to the second Bluetooth master in response to the establishment of the set frequency so as to transmit the updated satellite orbit information from the first Bluetooth master to the second Bluetooth master through the Bluetooth slave.

\* \* \* \* \*